US007577729B1

(12) United States Patent
Umbehocker et al.

(10) Patent No.: US 7,577,729 B1
(45) Date of Patent: Aug. 18, 2009

(54) DISTRIBUTED STORAGE MANAGEMENT SERVICES

(75) Inventors: Steve Umbehocker, Mercer Is, WA (US); Allen Unueco, Bellevue, WA (US)

(73) Assignee: Symantec Operating Corporation, Mountain View, CA (US)

( * ) Notice: Subject to any disclaimer, the term of this patent is extended or adjusted under 35 U.S.C. 154(b) by 876 days.

(21) Appl. No.: 10/304,438

(22) Filed: Nov. 26, 2002

(51) Int. Cl.
*G06F 15/173* (2006.01)
*G06F 15/167* (2006.01)
*G06F 12/00* (2006.01)

(52) U.S. Cl. ............... 709/223; 709/213; 711/114
(58) Field of Classification Search ............ 709/213, 709/223; 711/114
See application file for complete search history.

(56) References Cited

U.S. PATENT DOCUMENTS

| | | | | |
|---|---|---|---|---|
| 6,898,670 | B2 * | 5/2005 | Nahum | 711/114 |
| 6,931,427 | B2 * | 8/2005 | Musante et al. | 709/201 |
| 2002/0103954 | A1 * | 8/2002 | Karamanolis et al. | 710/105 |
| 2002/0129216 | A1 * | 9/2002 | Collins | 711/170 |
| 2002/0143942 | A1 * | 10/2002 | Li et al. | 709/225 |
| 2003/0149763 | A1 * | 8/2003 | Heitman et al. | 709/224 |
| 2004/0024854 | A1 * | 2/2004 | Mandal | 709/223 |

OTHER PUBLICATIONS

"Realizing SAN Potential with a Powerful Centralized Management Tool," VERITAS SANPoint™ Control, Aug. 9, 2002, (56 Pages).

* cited by examiner

*Primary Examiner*—Vivek Srivastava
*Assistant Examiner*—Tanim Hossain
(74) *Attorney, Agent, or Firm*—Robert C. Kowert; Meyertons, Hood, Kivlin, Kowert & Goetzel, P.C.

(57) ABSTRACT

Embodiments of a distributed storage integration mechanism. A host node may run a proxy for a storage service on another host node locally, and commands generated on the host node for the storage devices may be proxied out to the host node that hosts the storage service. Storage services may be installed on one or more hosts and other hosts may use proxies to the services to access and manage corresponding storage devices. In one embodiment, the distributed storage integration mechanism may support a peer-to-peer type system for accessing and managing storage devices on a network. A host may determine which other host(s) on the network includes a service for a particular storage device. The host may proxy in the object(s) to support the storage device. In one embodiment, the host may dynamically proxy in a GUI (graphical user interface) for the storage service.

20 Claims, 8 Drawing Sheets

DISTRIBUTED STORAGE MANAGEMENT SERVICES

BACKGROUND OF THE INVENTION

1. Field of the Invention

This invention is related to the field of storage management and, more particularly, to software used in storage management.

2. Description of the Related Art

In the past, large organizations relied heavily on parallel SCSI technology to provide the performance required for their enterprise data storage needs. More recently, organizations are recognizing that the restrictions imposed by SCSI architecture are too costly for SCSI to continue as a viable solution. Such restrictions include the following:

SCSI disk arrays must be located no more than 25 meters from the host server;

The parallel SCSI bus is susceptible to data errors resulting from slight timing discrepancies or improper port termination; and SCSI array servicing frequently requires downtime for every disk in the array.

One solution has been to create technology that enables storage arrays to reside directly on the network, where disk accesses may be made directly rather than through the server's SCSI connection. This network-attached storage (NAS) model eliminates SCSI's restrictive cable distance, signal timing, and termination requirements. However, it adds a significant load to the network, which frequently is already starved for bandwidth. Gigabit Ethernet technology only alleviates this bottleneck for the short term, so a more elegant solution is desirable.

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices. The versatility of the SAN model enables organizations to perform tasks that were previously difficult to implement, such as LAN-free and server-free tape backup, storage leasing, and full-motion video services.

Storage devices in SANs may be managed and accessed through services that may be installed (e.g. as plugins) on hosts in the SAN. Each service manages a separate vendor and model of array hardware. For example, one might manage a Compaq RA8000, another an EMC Symmetrix, another a Hitachi 9900. These services may allow management of the storage device (e.g. allocation of storage) through the management interface of the storage device. Some storage devices require direct connection to discover all the device information using the particular vendor's APIs. Typically, it is not desirable to install services on a host for every provider and model number because the stack would be too large.

Storage device interfaces are typically limited in terms of the number of allowed client connections, posing a scalability problem. SAN storage devices typically only allow one host to manage a particular storage device. Typically, the storage devices have no locking; i.e. the devices have no ability to service a request from one host in a locked mode, then unlock, lock and service a request from another host. Storage device APIs from vendors typically do not support events. If a change is made to the configuration, a host may not know about the change unless and until the host polls for changes. Hosts may have a controllable polling interval, and for overhead reasons it may not be desirable to poll too frequently. A host may only poll for changes every 15 minutes to half hour, for example. In prior art SAN system, every host node typically discovers everything; this may result in additional scalability problems due to the overhead involved in polling. Further, some SAN devices may use protocols (e.g. SNMP) that may not be scalable due to performance constraints. For example, it may take five minutes to "discover" a disk array using SNMP; if there 100 arrays, it may take 500 minutes of polling happening every 30 minutes to discover all of the arrays. An array typically cannot support that many hosts having access to the services.

This limited scalability may block access to distributed data. Multiple hosts may desire to run services to manage and access particular storage devices, but the scalability limitations may prevent more than one, two or three hosts from doing so. Thus, it is desirable to provide distributed storage management services that overcome the scalability problems in prior art SAN systems.

SUMMARY OF THE INVENTION

Embodiments of a distributed storage integration mechanism for providing distributed storage services in SAN environments are described. In one embodiment, one host node may manage a list of storage services for managing and accessing storage devices. This host node mediates storage services on the list for other host nodes that desire to access those services. A host node may run a proxy for a storage service locally, and commands generated on the host node for the storage devices may be proxied out to the host node that actually hosts the storage service. In one embodiment, the distributed storage integration mechanism may be used to discover storage devices and storage services at remote hosts and to publish the information for use in accessing data from the remote hosts, via proxies to the storage services, by products that integrate with the distributed storage integration mechanism. Using the distributed storage integration mechanism, services may be installed on one or more hosts and other hosts may use proxies to the services to access and manage storage devices.

In one embodiment, the distributed storage integration mechanism may allow the creation of a proxy object in a database on one machine for accessing a storage service for managing and accessing a storage device or devices hosted on another machine. Objects representing a storage service on a host including the storage service may be copied into another host proxying the storage service. Any changes to the objects in the original database may be updated in the database on the other host automatically.

In one embodiment, an application on a host, as a storage consumer, may analyze the storage assigned to it to determine the unique identifier(s) for the storage device(s) the storage came from. Other hosts may be discovered that include storage service(s) for the storage device(s) to obtain proxies to the storage service(s) for the storage device(s) that are providing storage to the consumer. The storage service for each storage device may include a set of objects that may each include data and a set of operations associated with the data. After the storage service has been proxied to the host, the objects may be automatically linked with storage objects from other applications.

In one embodiment, objects representing storage services on a host may be used by the host to directly manage and access storage devices on the SAN via the storage services. The host may provide proxy objects to other hosts for remotely accessing the storage services on the host for managing and accessing the storage devices via proxy. In one embodiment, a group of objects to proxy may be selected from a remote host and proxied to a primary host. Proxy objects for one or more storage services that are exposed by the objects on the remote host may be provided to the primary host. For example, n different hosts may each be connected to a different storage device and may each include a storage service for managing and accessing the storage device. Proxies for the storage services on the primary host may be used to collect information from the remote hosts to be managed by the primary host. Operations initiated on the primary host may be routed to the host providing the storage service to be performed.

In one embodiment, the distributed storage integration mechanism may support a peer-to-peer type system for accessing and managing storage devices on a network. A host may determine which other host(s) on the network includes a storage service for a particular storage device. The host may proxy in the device object(s) to support the storage device. In one embodiment, the host may dynamically proxy in a GUI (graphical user interface) for the storage service. Thus, in one embodiment, a host may proxy in the entire storage service without installing a specific driver (service) on the host.

BRIEF DESCRIPTION OF THE DRAWINGS

The following detailed description makes reference to the accompanying drawings, which are now briefly described.

Figure 1:
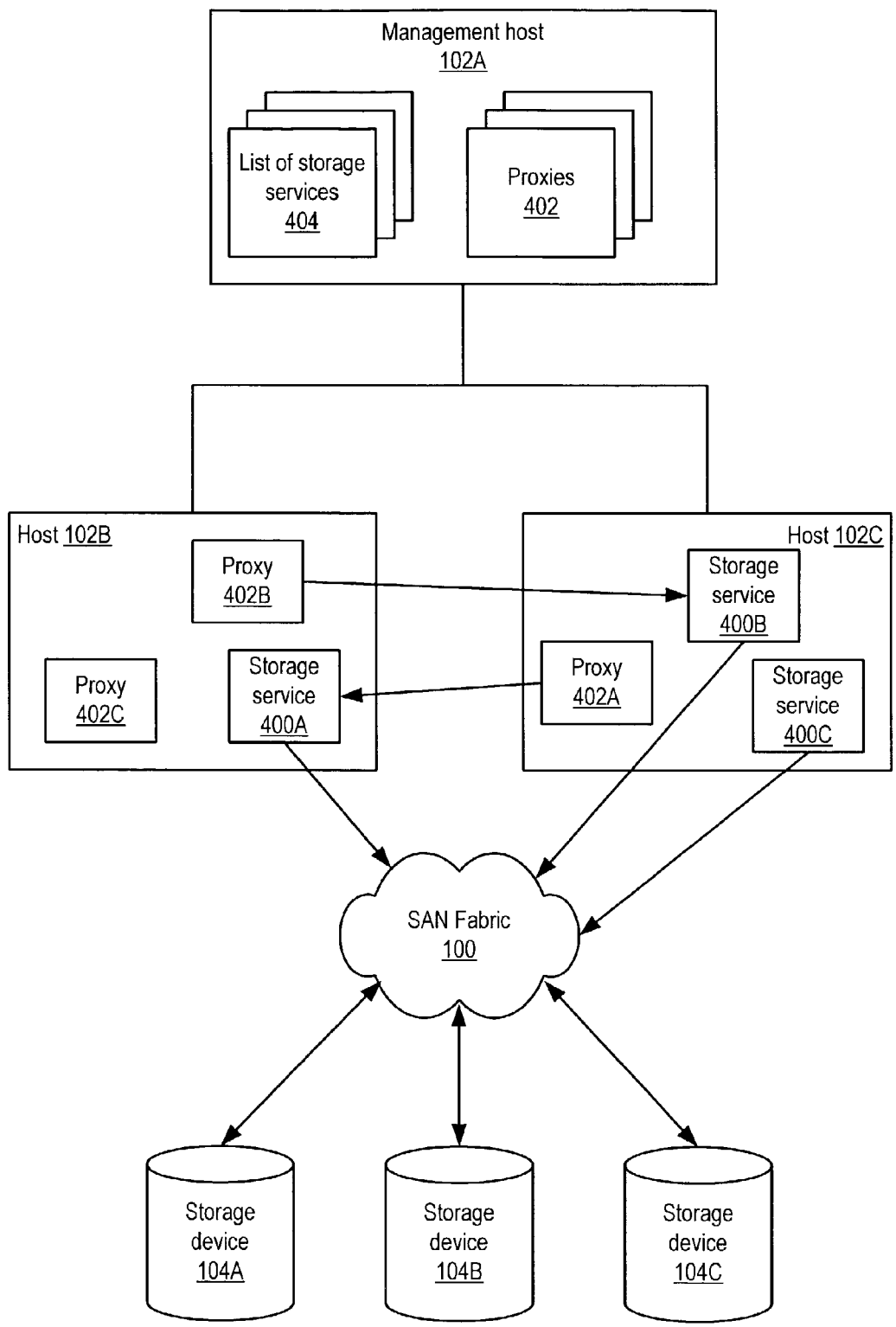
FIG. 1 illustrates a network implementing a distributed storage integration mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a distributed storage integration mechanism for providing distributed storage services in SAN environments are described. In one embodiment, one host node may manage a list of storage services for managing and accessing storage devices. This host node mediates storage services on the list for other host nodes that desire to access those storage services. A host node may run a proxy for a storage service locally, and commands generated on the host node for managing storage devices may be proxied out to the host node that actually hosts the storage service. For example, a host node may use the proxy to generate snapshots even if the host node does not host the storage service locally. As another example, an embodiment may be used to gather data from one or more storage devices on a SAN by proxying all the data to a local system.

In one embodiment, the distributed storage integration mechanism may be used to discover storage devices and storage services at remote hosts and to publish the information for use in accessing data from the remote hosts, via proxies to the storage services, by products such as a volume manager that integrate with the distributed storage integration mechanism. Embodiments of the distributed storage integration mechanism preferably provide scalability and simplify installation, among other benefits. In one embodiment, the distributed storage integration mechanism may provide a single source for data. The host node mediating the storage services may query for data and provide the data for access by host nodes and other users in an accessible data pool.

Embodiments of the distributed storage integration mechanism may be used, for example, in applications that cannot run a stack of storage services at every host. In these applications, installing storage services at every host may make the stacks of storage services too large to be practical. Using the distributed storage integration mechanism, storage services may be installed on one or more hosts and other hosts may use proxies to the storage services to access and manage storage devices.

Embodiments of the distributed storage integration mechanism may provide distributed storage management capability. In one embodiment, the distributed storage integration mechanism may allow the creation of a proxy object in a database on one machine for accessing a storage service for managing and accessing a storage device or devices hosted on another machine. Objects representing a storage service on a host including the storage service may be copied into another host proxying the storage service. Any changes to the objects in the original database may be updated in the database on the other host automatically.

In one embodiment, an application on a host, as a storage consumer, may analyze the storage assigned to it to determine the unique identifier(s) for the storage device(s) the storage came from. Other hosts may be discovered that include storage service(s) for the storage device(s) to obtain proxies to the storage service(s) for the storage device(s) that are providing storage to the consumer. The storage service for each storage device may include a set of objects that may each include data and a set of operations associated with the data. After the storage service has been proxied to the host, the objects may be automatically linked with storage objects from other applications including one or more of, but not limited to, a volume manager, a file service, an exchange service, and a net backup service. With the storage services dynamically integrated with the application objects, storage management tasks may be performed including one or more of, but not limited to, hot spot detection, automatic allocation of additional storage to grow volumes (e.g. when the volume run out of space), hardware snapshots, third party copying, and hardware data replication.

Embodiments of the distributed storage integration mechanism may provide automatic selection and integration. When storage is seen at a host, there are typically no management services offered by the storage itself. With the distributed storage integration mechanism, proxies to the storage services may be pulled to the host automatically when new storage is assigned to the host from anywhere. Embodiments of the distributed storage integration mechanism may provide scalability. By providing one or more management hosts that proxy the storage services to consumer hosts, many hosts can access, leverage, and integrate with those storage services.

Embodiments of the distributed storage integration mechanism may simplify deployment and upgrade of storage devices and storage services. Storage services and/or product stacks may be updated on hosts that have the storage services and/or product stacks locally installed. Other hosts proxying the storage services on the network may be dynamically updated because the other hosts are accessing the storage services through proxies. When storage is added to or upgraded on the network, the management host(s) may be upgraded with new storage services. An agent running at the consumer host(s) may automatically detect if the consumer host(s) needs the new or upgrading storage services based on what storage is assigned to the consumer host(s).

Embodiments of the distributed storage integration mechanism may provide failover capabilities. If a management host goes down, an agent on a consumer host may pull storage services from another management host offering storage services for storage devices accessed by the consumer host. Thus, storage services providing hardware support for machines on a network may be upgraded centrally at a single location (e.g. one host), and the storage services may be run via proxy on multiple hosts to preferably provide failover support.

In one embodiment, the distributed storage integration mechanism may use an object database to store information about storage service proxies. The object database may provide inheritance. Types and subtypes may be defined, and a subtype may have attributes. Base types of objects may be used to generically represent storage services for types of storage devices, and subtypes may be used to specifically represent storage services for managing particular types of storage devices. The objects may include, but are not limited to, information describing corresponding types of storage devices and one or more methods for accessing storage devices of the corresponding type. The database may be queried based on base type or subtype with particular attribute(s). Thus, a user may request information on storage devices without having to refer to the device manufacturers, allowing the information to be abstractly accessed. For example, a user may issue a request for all fibre channel controller cards or iSCSI controller cards. In one embodiment, derived classes with additional data fields and/or methods may be created for objects in the database.

In one embodiment, objects representing storage services on a host may be used by the host to directly manage and access storage devices on the SAN via the storage services. The host may provide proxy objects to other hosts for remotely accessing the storage services on the host for managing and accessing the storage devices via proxy. In one embodiment, a group of objects to proxy may be selected from a remote host and proxied to a primary host. Proxy objects for one or more storage services that are exposed by the objects on the remote host may be provided to the primary host. For example, n different hosts may each be connected to a different storage device and may each include a storage service for managing and accessing the storage device. Proxies for the storage services on the primary host may be used to collect information from the remote hosts to be managed by the primary host. Operations initiated on the primary host may be routed to the host providing the storage service to be performed.

In one embodiment, the distributed storage integration mechanism may provide storage device (e.g. array) virtualization. In one embodiment, a proxy agent on a host may contact other nodes on the network to obtain proxy storage services from the nodes for locally discovered storage devices. The proxy agent may analyze locally discovered storage devices. In one embodiment, storage devices may be discovered by a device discovery service that scans the SCSI bus and creates one device object for each device attached to a host. The proxy storage service may examine the list of device objects to identify which vendor, model and serial number exists for each enclosure behind particular devices. With this information, the proxy storage service may access a name service to identify which hosts include storage services for the devices.

In one embodiment, the distributed storage integration mechanism may support a peer-to-peer type system for accessing and managing storage devices on a network. A host may determine which other host(s) on the network includes a storage service for a particular storage device. The host may proxy in the device object(s) to support the storage device. In one embodiment, the host may dynamically proxy in a GUI (graphical user interface) for the storage service (e.g. a JAR file including the GUI logic, icons, dialogs, etc). Thus, a host may proxy in the entire storage service. Without installing a specific driver (service) on a host, the host may dynamically proxy in storage services such as snapshot, discovery of the storage device that the host is connected to, and the GUI of the storage service.

FIG. 1 illustrates a network implementing a distributed storage integration mechanism according to one embodiment. Storage devices 104 may include, but are not limited to, RAID (Redundant Array of Independent Disks) systems, disk arrays, JBODs (Just a Bunch Of Disks, used to refer to disks that are not configured according to RAID), tape devices, and optical storage devices. Each storage device 104 (e.g. storage devices 104A, 104B, and 104C) may include several components. For example, a storage array may include an enclosure, a set of Fibre Channel adapters and ports, bindings, Access Control Lists (ACLs), and ACL entries. In one embodiment, a set of objects may describe the components of discovered storage devices in one or more databases on the hosts 102. The objects may include, but are not limited to, information about the corresponding components and one or more methods for accessing the corresponding components. Hosts 102 may run any of a variety of operating systems, including, but not limited to, Solaris 2.6, 7 or 8, Microsoft Windows NT 4.0 (Server and Enterprise Server), and Microsoft Windows 2000 (Server, Advanced Server and Datacenter Editions). SAN fabric 100 enables server-to-storage device connectivity, for example through Fibre Channel switching technology. SAN fabric 100 may include one or more switches 108, bridges 110, hubs 112, or other devices 114 such as routers, as well as the interconnecting cables (for Fibre Channel SANs, fibre optic cables).

Host 102A has discovered storage device 104A, and host 102C has discovered storage devices 104B and 104C. Host 102A includes storage service 400A for managing and accessing storage device 104A. Host 102C includes storage services 400B and 400C for managing and accessing storage devices 104B and 104C, respectively. Each host (which has discovered a storage device 104 (hosts 104B and 104C) may include a stack of vendor APIs for accessing and managing vendors' storage devices including a product stack of one or more APIs specific to the discovered storage device 104. The storage service 400 for the storage device 104 may integrate with the product stack to provide access and management of the corresponding storage device 104 from the host 102 via the storage service 400.

Rather than independently discovering information about storage devices 104A, 104B, and 104C, management host 102A may determine what hosts 102 are on the network (hosts 104B and 104C), for example by accessing a name service to identify hosts on the network registered with the name service. Once a host 102 (e.g. host 102B) is discovered, management host 102A may determine what storage devices 104 are "local" to (i.e. have been discovered by and are supported by) the discovered host 102B. In one embodiment, information on supported storage devices 104 may be included in the information about the host 102 on the name service. In another embodiment, management host 102A may communicate directly with the host 102B to determine what storage devices 104 are directly supported by the host (for host 102B, storage device 104A). Management host 102A may then proxy in objects (proxies 402) for managing and accessing the storage device(s) 104 directly supported by the discovered hosts 102, if desired. For host 102B, management host 102A may proxy in objects to manage and access storage device 104A. These objects may include a GUI for accessing and managing storage device 104A. In one embodiment, when the objects are proxied over, a JAR (Java Applications Extension) file is copied over and plugged into a GUI framework. For host 102C, management host 102A may proxy in objects to manage and access storage devices 104B and 104C.

Management host 102A may then access and manage storage devices 104 via the obtained proxies 402 to the storage devices 104. For example, if management host 102A obtains a proxy 402 for storage device 104A from host 102B, then management host 102A may access and manage storage device 104A via the corresponding proxy 404. Commands issued via the proxy 404 for storage device 104A are routed to storage service 400A on host 102B, which then accesses the product stack corresponding to storage device 104A to perform the command. Results (if any) of the command may be routed back to the proxy 404 on management host 102A via storage service 400A. Alternatively, results may be directly returned to management host 102A. From management host 102A, access and management of a storage device such as storage device 104A via a proxy 404 may be transparent; that is, from management host 102A, it may appear that the host is directly accessing and managing the storage device 104A.

On management host 104A, an application (e.g. a volume manager or the exemplary SAN management system described below) that consumes information from storage devices 104 may be running. The application may need to manage a particular storage device 104 by issuing a management operation. This operation is proxied out to the host 102 that has the actual storage service 400 for that operation. For example, the application may desire to allocate or delete a virtual disk on storage device 104A. Storage service 400A may be running remotely on host 102B. The request may be routed to the remote host 102A hosting the storage service 400A proxied on management host 102A. Host 102B may service the request by routing a method call to storage device 104A. Storage device 104A may respond to host 104B with operation completion information. This response may be returned to management host 102A. Some applications such as the exemplary SAN management system described below may use proxies 404 for operations such as zoning/LUN security operations, etc.

FIG. 1 further illustrates how an embodiment of the exemplary SAN management system described below may implement an embodiment of the distributed storage integration mechanism. Management host 102A would include the management server as described for the SAN management system. In one embodiment, only management host 102A would proxy in support for storage devices 104. In a cluster configuration, if the management host 102A goes down, another host (e.g. host 102B) may become the management host. The new management host may access the name service to determine what storage devices 104 are on the network and dynamically proxy in support for the storage devices.

In one embodiment, hosts 102 on the network other than management host 102A may also obtain proxies 404 for storage services 400 on other hosts 102 on the network. In one embodiment, management host 102A may maintain a list of storage services 404 including information describing storage services 400 discovered on discovered hosts 102. This list of storage services 404 may include information describing storage services 400 that management host 102A does not include proxies 402 for. A host 102 such as host 102B may access this list of storage services 404 on management host 102A to discover storage devices supported by other hosts 102 on the network. For example, host 102B may access the list of storage services 404 and discover that host 102C locally supports storage devices 104B and 104C. Host 102B may then decide to proxy in objects to support one or more of the storage devices 104 locally supported by one or more other hosts 102. In one embodiment, a host 102 other than the management host 102A may access the name service to discover another hosts 102 on the network, may discover storage devices 104 directly supported by the other host 102, and may decide to proxy in objects to access and manage the storage devices from the other host 102, rather than going through the management host 102A.

As an example, host 104B may obtain proxies 402B and 402C to support storage devices 104B and 104C, respectively, locally supported by host 104C via storage services 404B and 404C. In one embodiment, these proxies 402 may be obtained from management host 102A. In another embodiment, host 104B may communicate with host 104C to obtain proxies 402B and 402C. Host 102B may then access and manage storage devices 104B and 104C via the obtained proxies 402B and 402C. Commands issued via proxy 404A for storage device 104A are routed to storage service 400A on host 102B, which then accesses the product stack corresponding to storage device 104A to perform the command. Results (if any) of the command may be routed back to proxy 404A on host 102C via storage service 400A. Alternatively, results may be directly returned to host 102C. Likewise, host 102C may obtain a proxy 402A to access and manage storage device 104A via proxy. To a host 102 running a proxy 402, the management and access of the corresponding storage device 104 is transparent; an application running on the host cannot differentiate a storage service running via proxy on the host from a storage service running locally.

Figure 2:
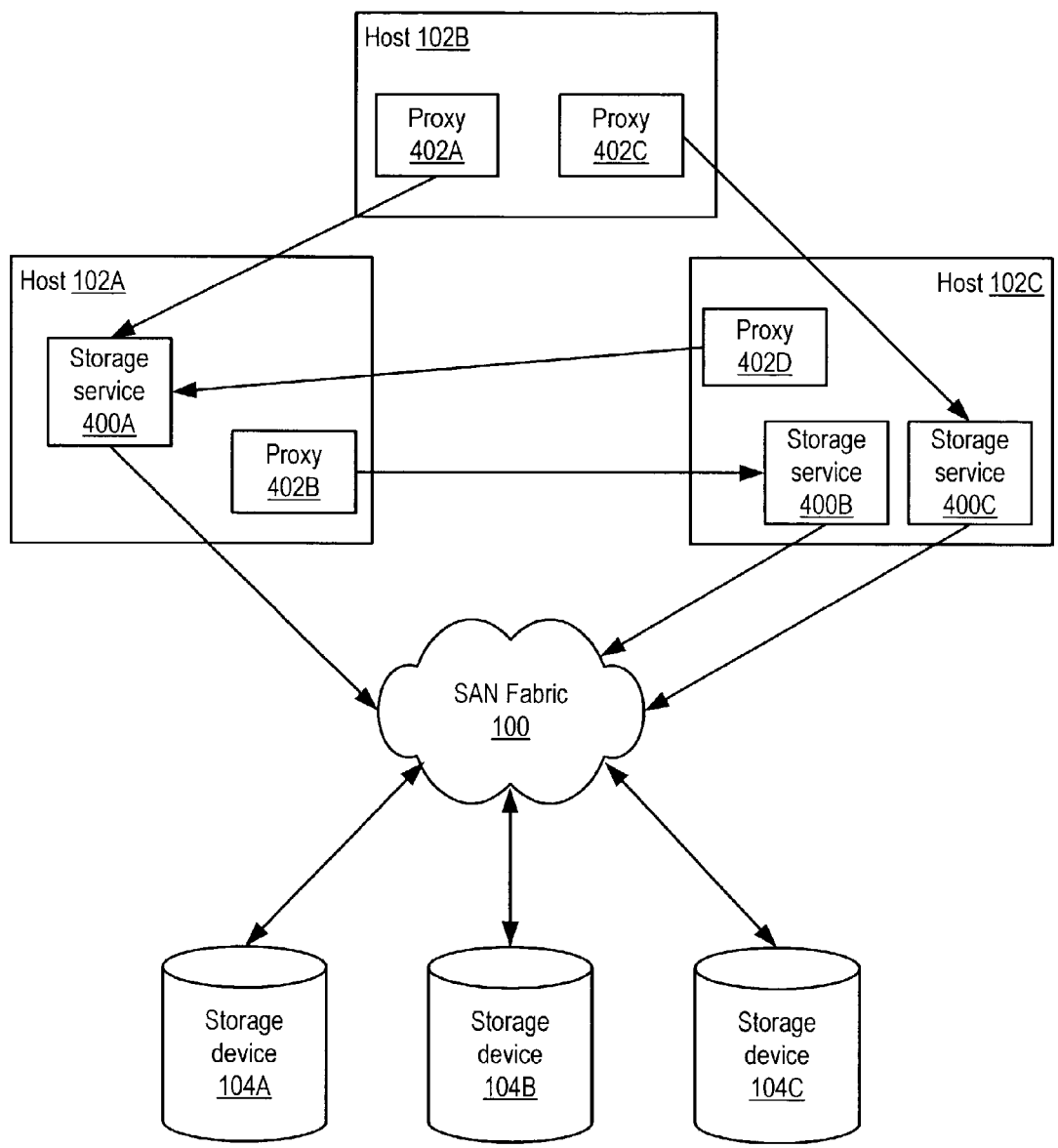
FIG. 2 illustrates a network implementing a distributed storage integration mechanism in a peer-to-peer host environment according to one embodiment.

In one embodiment, the distributed storage integration mechanism may be used in peer-to-peer systems and may allow the proxying in of information from any host 102 to any host 102. FIG. 2 illustrates a network implementing a distributed storage integration mechanism in a peer-to-peer host environment according to one embodiment. Data may be pulled and exchanged across the network as needed to lessen the load incurred on hosts 102 managing storage devices 104. In this example, host 102A has discovered storage device 104A and includes a storage service 400A for accessing and managing storage device 104A. Host 102C has discovered storage devices 104B and 104C and includes storage services 400B and 400C for accessing and managing storage devices 104B and 104C, respectively.

Host 102B may determine what hosts 102 are on the network (hosts 102B and 102C), for example by accessing a name service to identify hosts on the network registered with the name service. Once a host 102 (e.g. host 102A) is discovered, host 102B may determine what storage devices 104 are "local" to (i.e. have been discovered by and are supported by) the discovered host. In one embodiment, information on supported storage devices 104 may be included in the information about the host 102 on the name service. In another embodiment, host 102B may communicate directly with the host 102A to determine what storage devices 104 are directly supported by the host (for host 102A, storage device 104A). Host 102B may then proxy in objects (proxy 402A) for managing and accessing the storage device 104A directly supported by the discovered hosts 102A, if desired. These objects may include a GUI (e.g. JAR file) for accessing and managing storage device 104A. For host 102C, host 102B may proxy in objects (proxy 402C) to manage and access storage device 104C.

Similarly, hosts 102A and 102C may determine what hosts 102 are on the network, what storage devices 104 are supported by the hosts 102, and may proxy in objects to access and manage one or more of the storage devices 104, if desired. In this example, host 102A includes a proxy 402B for storage service 400B on host 102C for managing and accessing storage device 104B by proxy, and host 102C includes a proxy 402D for storage service 400A on host 102A for managing and accessing storage device 104A by proxy.

In one embodiment, local storage may be analyzed to determine what to proxy. For example, a host 102 may detect storage devices 104 directly connected to the host and/or connected to a SAN fabric (e.g. direct-attached SCSI devices, iSCSI devices, Fibre Channel-attached devices, etc.). In one embodiment, a local, in-band discovery may be performed to detect locally attached storage devices 104. In one embodiment, a SCSI query may be issued on the local SCSI bus. In one embodiment, a scan of the local SCSI bus may be performed to discover the storage devices 104. Any storage device 104 that complies with the SCSI standard will be detected by the scan of the local SCSI bus (e.g. direct-attached SCSI devices, iSCSI devices, Fibre Channel-attached devices, etc.). With SCSI, when a host 102 boots, storage devices 104 such as a Seagate drive, a MAXSTOR drive, etc, may be detected, and a list of the detected storage devices 104 may be generated. In one embodiment, the SCSI query may generate vendor- and device-specific information from each storage device 104. In one embodiment, this information may include unique identifiers for the storage devices 104. These unique identifiers may be used, for example, to locate other hosts 104 registered with a name service that include services for supporting the storage devices which may be proxied by the host 102.

When booting is completed, the host 102 may not include storage services for the detected storage devices 104. The host 102 may be able perform I/O operations to the storage devices 104, but there may be no snapshot services or other storage services locally available to perform other access or management functions. In one embodiment, an agent on the host 102 may examine the list of detected storage devices 104 (directly attached or on a fabric) and may identify storage devices 104 that may have storage services available on other hosts 102. Once the storage devices 104 are discovered and unique identifiers are determined for the storage devices 104, the host 102 may check with the name service to determine if the storage device 104 is supported by other hosts 102 and may proxy in storage services 400 for the storage devices 104 from the other hosts 102 to the local host 102. Storage services 400 may be proxied in to allocate additional storage, to create/delete bindings, control LUN masks, to do point-in-time snapshots, etc., all on the local machine via proxy without having to install additional software (the actual storage services 400 and product stacks) on the local host 102. Proxies 402 to storage services 400 may be obtained from hosts 102 on the network which are connected to the storage devices 104 and have the storage services 400 up and running.

Using the distributed storage integration mechanism, storage services 400 may be proxied anywhere (to any host) on the network. A storage device 104 may be accessed by and may provide data to many hosts 102 on the network via proxies for a storage service. Management of a storage device 104 may be performed from many hosts 102 rather than from one host 102.

Figure 3:
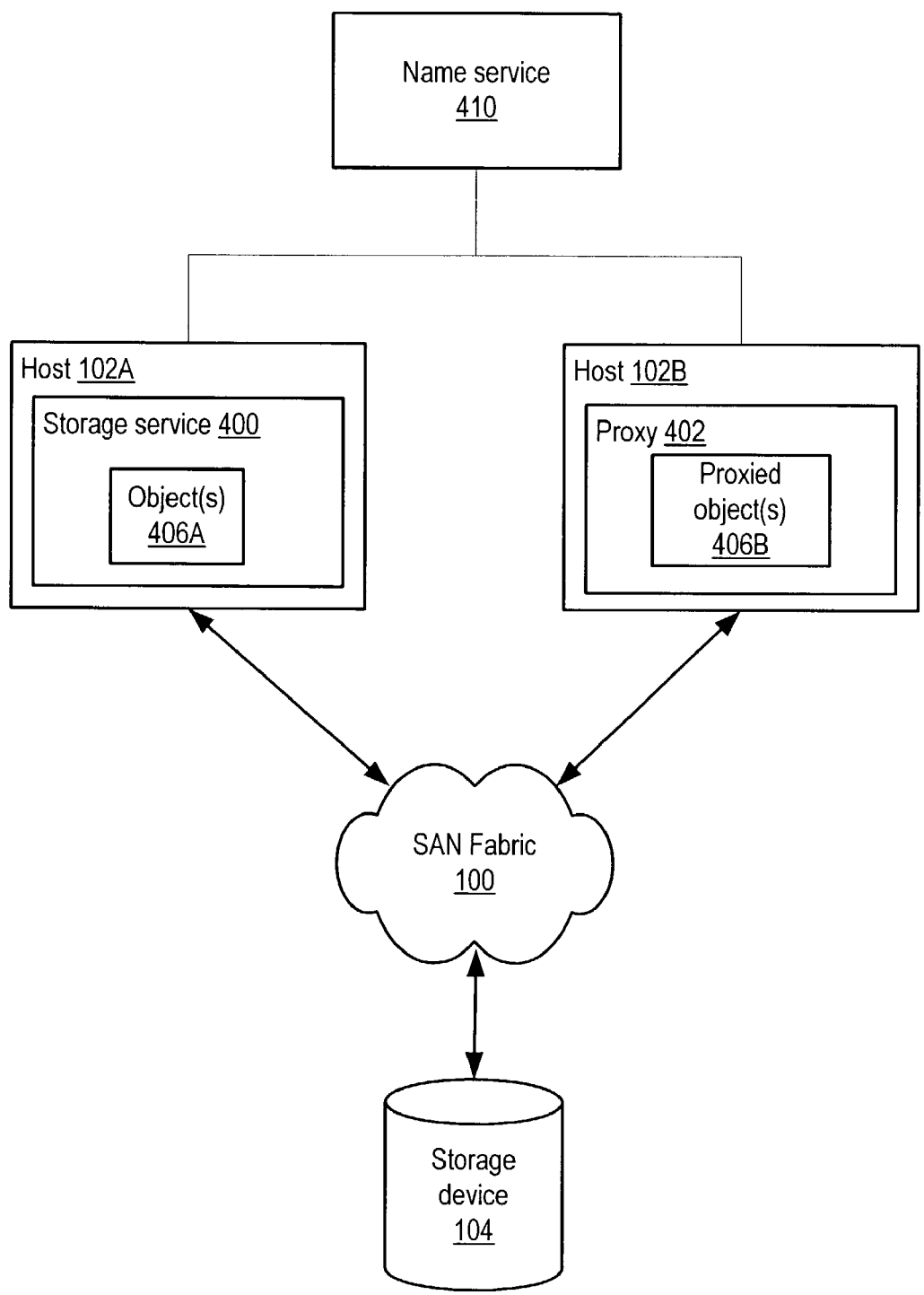
FIG. 3 illustrates using a name service to discover other hosts including objects representing storage services according to one embodiment.

FIG. 3 illustrates using a name service to discover other hosts including objects representing storage services according to one embodiment. In this example, host 102A has discovered storage device 104 and includes a storage service 400 for accessing and managing storage device 104. Host 102B may discover storage device 104. In one embodiment, local host data buses (e.g. SCSI) may be scanned to discover local storage devices. In one embodiment, the host 102B may obtain a unique identifier for discovered storage devices. In one embodiment, after discovering a device, a host 102 may query the device to obtain its unique identifier. Once host 102B discovers storage device 104, the distributed storage integration mechanism may provide means for host 102B to discover a storage service for the storage device. In one embodiment, host 102B may access name service 410 to identify hosts including host 102A on the network registered with the name service 410. Once host 102A is discovered, in one embodiment, host 102B may access host 102A to determine that storage devices 104 is "local" to (i.e. has been discovered by and is supported by) the discovered host 104A. In another embodiment, name service 410 may include information on what storage services 400 are available on host 102A, and host 102B may retrieve this information from the name service 410. In one embodiment, the name service may include unique identifiers for storage devices supported by registered hosts 102, and the unique identifier obtained from the storage device by host 102B may be compared to the unique identifiers on the name service to find matches. In this example, the name service may include a unique identifier for storage device 104 supported by host 102A, which may be matched with the unique identifier obtained by host 102B. The distributed storage integration mechanism may provide means for generating a proxy 402 for the storage service 400 on the host system 102B. In one embodiment, host 102A may include one or more objects 406A representing storage service 400. Host 102B may proxy in copies of the objects 406B for managing and accessing the storage device 104 directly supported by the discovered hosts 102A, if desired. The distributed storage integration mechanism may provide means for generating storage service commands to perform one or more storage functions on the storage device via the proxy. In one embodiment, proxied objects 406B may include a GUI (e.g. JAR file) for generating storage service commands for accessing and managing storage device 104 via proxy.

Figure 4:
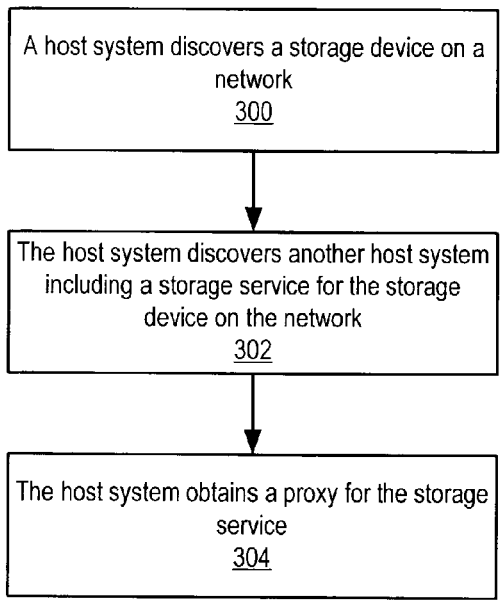
FIG. 4 is a flowchart illustrating a method for a host system to proxy in support for a storage device according to one embodiment.

FIG. 4 is a flowchart illustrating a method for a host system to proxy in support for a storage device according to one embodiment. As indicated at 300, a host system may discover a storage device on a network. For example, when booting, the host system may locally discover one or more storage devices coupled to the host system and allocated to provide storage to the host system. In one embodiment, local host data buses may be scanned to determine what storage devices are coupled to the host system. As another example, additional storage on the storage device may be allocated to the host system during runtime. As indicated at 302, the host system may discover another host system including a storage service for the storage device on the network. In one embodiment, the host system may access a name service to discover one or more other host systems coupled to the network. In one embodiment, the host system may obtain a unique identifier from each storage device it locally discovers, and may provide these unique identifiers to be matched, if possible, with unique identifiers of storage devices supported by one or more other host systems registered with the name service. As indicated at 304, the host system may obtain a proxy for the storage service from the other host system. In one embodiment, the storage service may be represented by one or more database objects on the other host system, and the host system may obtain copies of the one or more database objects. In one embodiment, the host system may obtain a GUI for the proxied storage service (e.g. in a JAR file) from the other host system.

Figure 5:
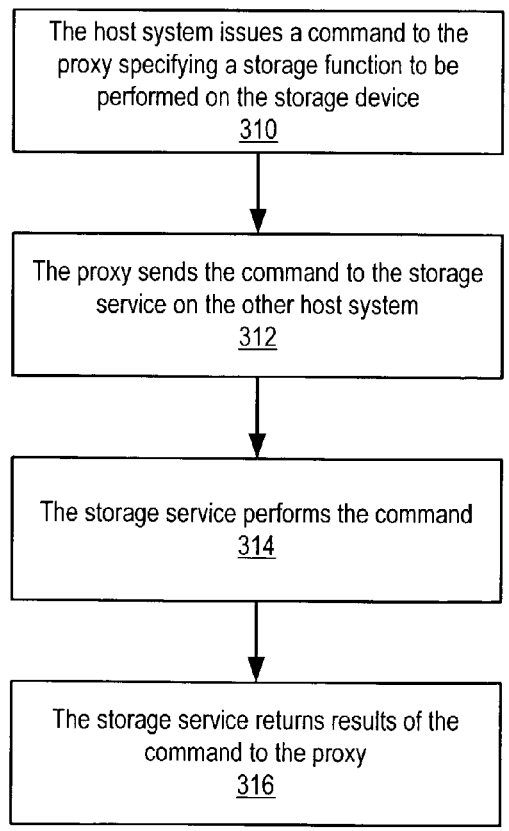
FIG. 5 is a flowchart illustrating a method for issuing commands to a storage device via proxy according to one embodiment.

FIG. 5 is a flowchart illustrating a method for issuing commands to a storage device via proxy according to one embodiment. Once a host system obtains a proxy to a storage service on another host system (for example, as illustrated in FIG. 4), the host system may issue a command to the proxy specifying a storage function to be performed on the storage device as indicated at 310. In one embodiment, the command may be issued via a GUI to the proxied storage service. As indicated at 312, the proxy may send the command to the storage service on the other host system. The storage service on the other host system may then perform the command as indicated at 314. In one embodiment, the storage service may interface with a product stack on the other host system to perform the command. As indicated at 316, the storage service may return results of the command, if any, to the proxy of the storage service on the host system. The results may be displayed on the GUI to the proxied storage service.

Embodiments of the distributed storage integration mechanism may be used, for example, in SAN management systems such as the exemplary SAN management system described below. Storage devices may require that a host directly connect to them to discover information using the vendors' APIs. A SAN management system may run from a primary, central location (host). In one embodiment, the primary host may serve as a central store where information about storage devices and other SAN components may be collected in one place to be managed by the SAN management system. Information from other hosts may be provided to the primary host. These other hosts may be referred to as "remote" hosts. Storage services may run at the remote hosts to collect the information from the storage devices. Proxies for the storage services may run on the primary host to collect the information for the central store so that the information and storage devices can be centrally managed. In addition, the managing host may manage a list of storage services on hosts in the network for managing storage devices. A host desiring to manage or access a storage device may access the managing host to determine if there is another host with a storage service for that storage device and, if so, to obtain a proxy for the storage service. The managed information, including the list of storage services, may be moved to another host to switch the management responsibilities to the other host, for example if the current managing host is going offline.

While the distributed storage integration mechanism is generally described as providing a mechanism to create proxies to storage services for storage devices, it is noted that embodiments may include the capability to create proxies for services specific to other SAN devices including one or more of, but not limited to, switches, NAT hardware, and iSCSI hardware. Further, while the distributed storage integration mechanism is generally described as providing a mechanism to create proxies to services for storage devices in Storage Area Network (SAN) environments, it is noted that embodiments may be used in other environments including other storage environments.

SAN Management System

Figure 6:
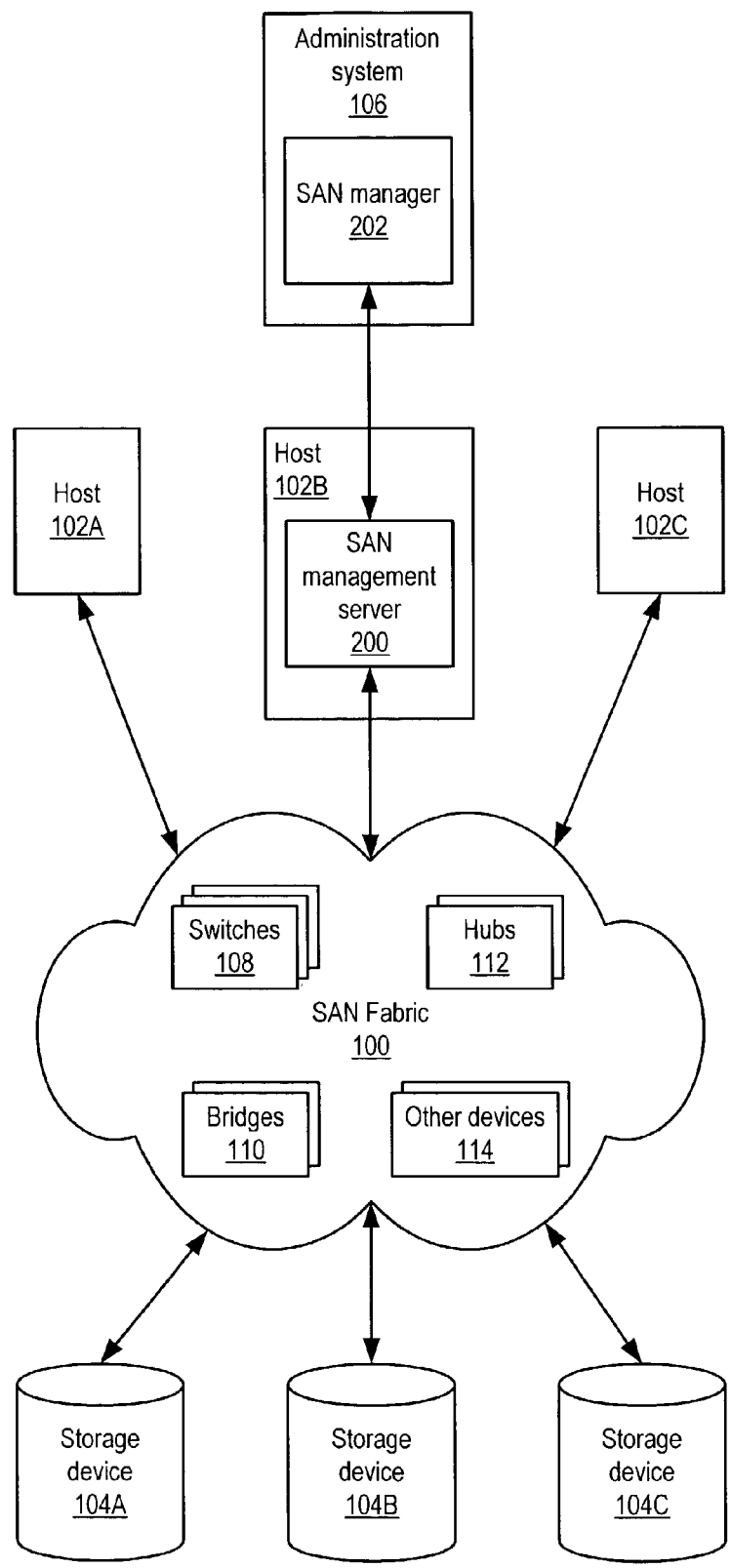
FIG. 6 shows an exemplary SAN implementing an embodiment of the SAN management system.

Embodiments of a centralized Storage Area Network (SAN) management system are described. Embodiments of the distributed storage integration mechanism may be used in the centralized SAN management system to provide proxies on hosts in the SAN to services on other hosts in the SAN for accessing and managing various SAN devices including storage devices via proxy. FIG. 6 shows an exemplary SAN implementing an embodiment of the SAN management system. For one embodiment, SAN may be described as a high-speed, special-purpose network that interconnects storage devices 104 (e.g. storage devices 104A, 104B, and 104C) with associated data servers (e.g. hosts 102A, 102B, and 102C) on behalf of a larger network of users. A SAN may employ Fibre Channel technology. A SAN may include one or more hosts 102 (e.g. hosts 102A, 102B, and 102C), one or more storage devices 104 (e.g. hosts 102A, 102B, and 102C), and one or more SAN fabrics 100. A SAN may also include one or more administration systems 106. One or more end-user platforms (not shown) may access the SAN, typically via a LAN or WAN connection to one or more of the hosts 102.

Storage devices 104 may include, but are not limited to, RAID (Redundant Array of Independent Disks) systems, disk arrays, JBODs (Just a Bunch Of Disks, used to refer to disks that are not configured according to RAID), tape devices, and optical storage devices. Hosts 102 may run any of a variety of operating systems, including, but not limited to, Solaris 2.6, 7 or 8, Microsoft Windows NT 4.0 (Server and Enterprise Server), and Microsoft Windows 2000 (Server, Advanced Server and Datacenter Editions). Each host 102 is typically connected to the fabric 100 via one or more Host Bus Adapters (HBAs). SAN fabric 100 may enable server-to-storage device connectivity through Fibre Channel switching technology. SAN fabric 100 hardware may include one or more switches 108, bridges 110, hubs 112, or other devices 114 such as routers, as well as the interconnecting cables (for Fibre Channel SANs, fibre optic cables).

Embodiments may simplify and centralize the management of heterogeneous SANs to enable control of SAN resources including, but not limited to, logical volumes, fibre channel adapters, and switches 108, as well as storage devices 104. A logical volume is a virtual disk made up of logical disks. A logical disk (also referred to as a logical device) is a set of consecutively addressed FBA (Fixed Block Architecture) disk blocks that is part of a single virtual disk-to-physical disk mapping. Logical disks are normally not visible to the host environment, except during array configuration operations. A virtual disk is a set of disk blocks presented to an operating environment as a range of consecutively numbered logical blocks with disk-like storage and I/O semantics. The virtual disk is the disk array object that most closely resembles a physical disk from the operating environment's viewpoint.

Embodiments may provide centralized management of SAN-connected devices with automatic discovery, visualization, access control, and policy-based monitoring, alerting and reporting. Embodiments may provide a single point of management from logical unit to interconnect to SAN-connected hosts 102. A LUN (logical unit number) is the SCSI (Small Computer System Interface) identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk typically has a single logical unit. Tape drives and array controllers may incorporate multiple logical units to which I/O commands can be addressed. Each logical unit exported by an array controller may correspond to a virtual disk. An interconnect is a physical facility by which system elements are connected together and through which they can communicate with each other (e.g. I/O buses and networks.)

Embodiments may provide data-centric management from host applications through interconnects to the storage resources, regardless of the underlying hardware and operating system(s). SAN management may occur at physical and logical levels to maintain control regardless of the underlying device environment. With the discovery of host attributes like OS platform, OS handles and IP address, the critical link associating logical devices to a host 102 and its applications may be made.

One embodiment may include a SAN management server 200 and one or more SAN managers 202. SAN management server 200 may discover SAN objects and their attributes, and may provide event management, policy management, and/or notification services. SAN management server 200 may explore the SAN to make data available to client applications, including SAN manager 202. SAN management server 200 may run in a variety of operating systems. One embodiment may include an integrated volume manager that may provide capabilities including, but not limited to, pooling storage across multiple heterogeneous arrays on the SAN. The SAN management system may automatically discover and display volumes within its interface. Additionally, adding storage to a host may be streamlined though the SAN management system. In one embodiment, when zoning storage to a host, an operating system rescan may be automatically initiated so that the new device is immediately available for use by the volume manager on the host.

Embodiments may reduce or eliminate the manual task of tracking of devices and their connections in the SAN by automatically discovering the physical and logical connections of the SAN, displaying the information in a graphical topology map and logging the data in a variety of inventory reports. One embodiment may enable the automatic discovery of SAN resources using one or more in-band and/or out-of-band protocols and industry standards (e.g. MS/CT, GS-3, SNMP, Fibre Alliance MIB, ANSI T11, vendor-specific extensions, etc.). Using both in-band and out-of-band protocols, and leveraging industry standards, the SAN management system may automatically capture and display details, including, but not limited to, device driver version, firmware level, status, performance, free and in-use port count, hardware manufacturer, model number and worldwide name (WWN). In-band refers to transmission of a protocol other than the primary data protocol over the same medium (e.g. Fibre Channel) as the primary data protocol. Out-of-band refers to transmission of management information for Fibre Channel components outside of the Fibre Channel network, typically over Ethernet. In one embodiment, a storage administrator may assign customized attributes to devices in the SAN for use in tracking information such as physical location, account code, installation date and asset tag number.

SAN manager 202 may provide a central management interface for various SAN management tasks, and may provide a graphical user interface for displaying the information (e.g. XML data) compiled by and received from SAN management server 200 in graphical and/or textual format, and may provide a user interface for accessing various features of the SAN management system such as tools and utilities. SAN manager 202 may run on any of a variety of end-user platforms coupled to one or more of the hosts 102, typically via a LAN or WAN, or alternatively may run on one of the hosts 102, including the host 102 that includes SAN management server 200. One embodiment may provide in-context launch support for element managers supplied by device vendors to provide vendor-specific management. In one embodiment, to directly manage a device, the administrator may telnet to the device via the SAN manager.

Embodiments may provide customizable, intuitive views into a SAN based on host 102, device, fabric 100, or storage groups, as well as real-time alerts to diagnose and avoid outages. In one embodiment, SAN manager 202 may serve as a centralized point from which a user may view information about a SAN, including, but not limited to, information about the SAN's topology and heterogeneous components. In one embodiment, SAN manager 202 may provide a graphical user interface (GUI) to display information from the SAN access layer and other SAN management server components.

In one embodiment, SAN manager 202 may provide a GUI for facilitating management by allowing the user to graphically drill down into the logical and physical devices on the SAN. One embodiment may provide the ability to zoom in or out on areas of interest in a SAN topology map to simplify the navigation of a growing enterprise SAN. Within the topology map, integrated tool tips may be provided to help identify devices and paths in the SAN without having to navigate through a complex topology. Information on SAN devices, such as hosts 102 with Host Bus Adapters (HBAs), interconnects, and storage devices 104, may be displayed in context in the GUI, revealing resources in zones as they are physically and logically connected. One embodiment may include a search mechanism. For example, if the administrator wants to ensure that all interconnects in the SAN are at the same firmware level, the administrator may query an integrated search tool for firmware levels to automatically locate all the devices that match the search criteria for the specific firmware level.

One embodiment may provide a real-time alert viewer that may monitor heterogeneous device status, and may provide proactive management capabilities in the SAN environment.

Through policies, the status and performance of the device(s) may be monitored, and alerts may be generated when behavior falls outside acceptable boundaries. Embodiments may enable intelligent monitoring through user-definable threshold levels and may perform actions automatically as well as notify administrators of critical events in real time.

Embodiments may provide both real-time and historical performance data for critical service-level parameters such as connectivity, available space and throughput. One embodiment may enable real-time performance charting of SAN devices. Embodiments may monitor interconnect and storage devices in real time, and may be used to display information about the various SAN devices such as current load/status. Through real-time performance monitoring, with flexible user-defined thresholds, one embodiment may notify administrators about issues that could affect overall SAN performance before the issues have an impact. Logging this data for reporting may, for example, extend the administrator's capability to audit and validate service-level agreements.

One embodiment may include a SAN reporter that enables the user to generate and view reports on details of the SAN. In one embodiment, the SAN manager may serve as a centralized point from which reports may be generated and viewed. Embodiments may provide both real-time and historical performance data for critical service-level parameters such as connectivity, available space and throughput. In one embodiment, the SAN management server may collect SAN data that may be provided as real-time and/or historical performance data to the SAN reporter for use in generating SAN performance reports. One embodiment may include "out-of-the-box" or predefined reports that allow users to inventory and analyze their SANs. Embodiments may provide detailed capacity reports to aid in growth planning and gathers detailed information for use in chargeback reports. One embodiment may track LUN allocation to hosts as well as to storage groups, distilling real-time and historical reports that show where storage resources are being consumed.

Figure 7:
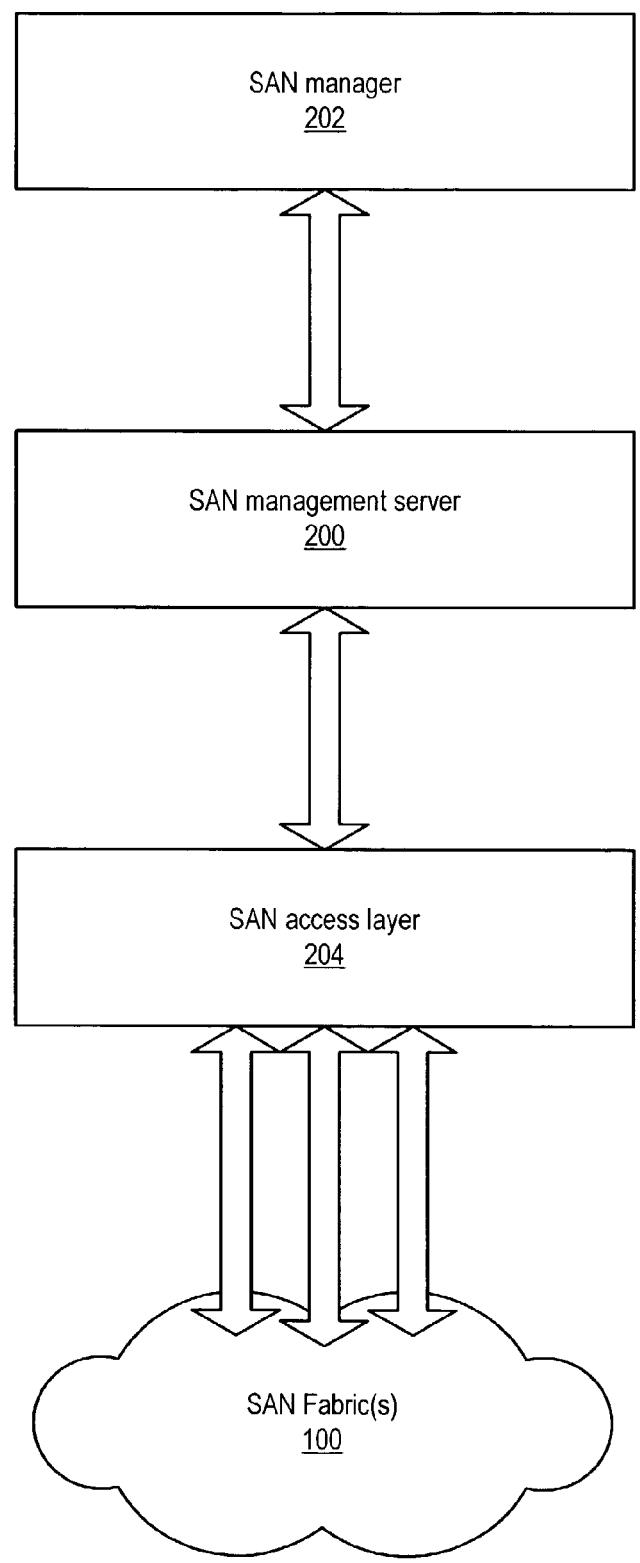
FIG. 7 illustrates the architecture of the SAN management system according to one embodiment.

FIG. 7 illustrates the architecture of the SAN management system according to one embodiment. This embodiment may be based on distributed client-server architecture, and may be divided into components that may include a SAN manager 202, a SAN management server 200, and a SAN access layer 204. The functions of SAN management server 200 may include one or more of, but are not limited to: automatically discovering SAN-attached objects including hosts, HBAs, switches and storage devices; maintaining a data store of real-time object information; managing SAN resources through zoning and LUN access control; monitoring conditions on the SAN; performing policy-based actions in response to SAN conditions; generating inventory and performance reports; and supporting user-defined grouping of objects based on quality of service (QoS) criteria.

By discovering objects and the relationship of these objects to each other, SAN access layer 204 may maintain a real-time topology of the SAN. SAN access layer 204 may also directly interface with switches on one or more fabrics to manage the zoning of storage resources. SAN access layer 204 may discover additional information about objects on the SAN that SAN management server 200 cannot discover directly, such as devices on a separate zone or fabric 100.

SAN manager 202 may be a central point for the user to perform one or more of SAN management tasks including, but not limited to, administering the SAN, viewing topographical displays of discovered objects on the SAN, accessing detailed information on components including object attributes and connectivity, creating and modifying policies, administering access control through zoning and LUN security, monitoring SAN events including real-time alerts, allocating storage resources, generating and viewing inventory and performance reports, generating and viewing real-time and historical reports, and/or launching utilities, tools and applications, which may include third-party management tools. In one embodiment, other applications, such as a Web browser, may function as clients to SAN management server 200. In one embodiment, multiple SAN managers 202 may connect simultaneously with SAN management server 200. One embodiment may include a command line interface that enables the user to query and modify SAN management server alarm service objects, configuration settings and perform other related SAN management system tasks.

Figure 8:
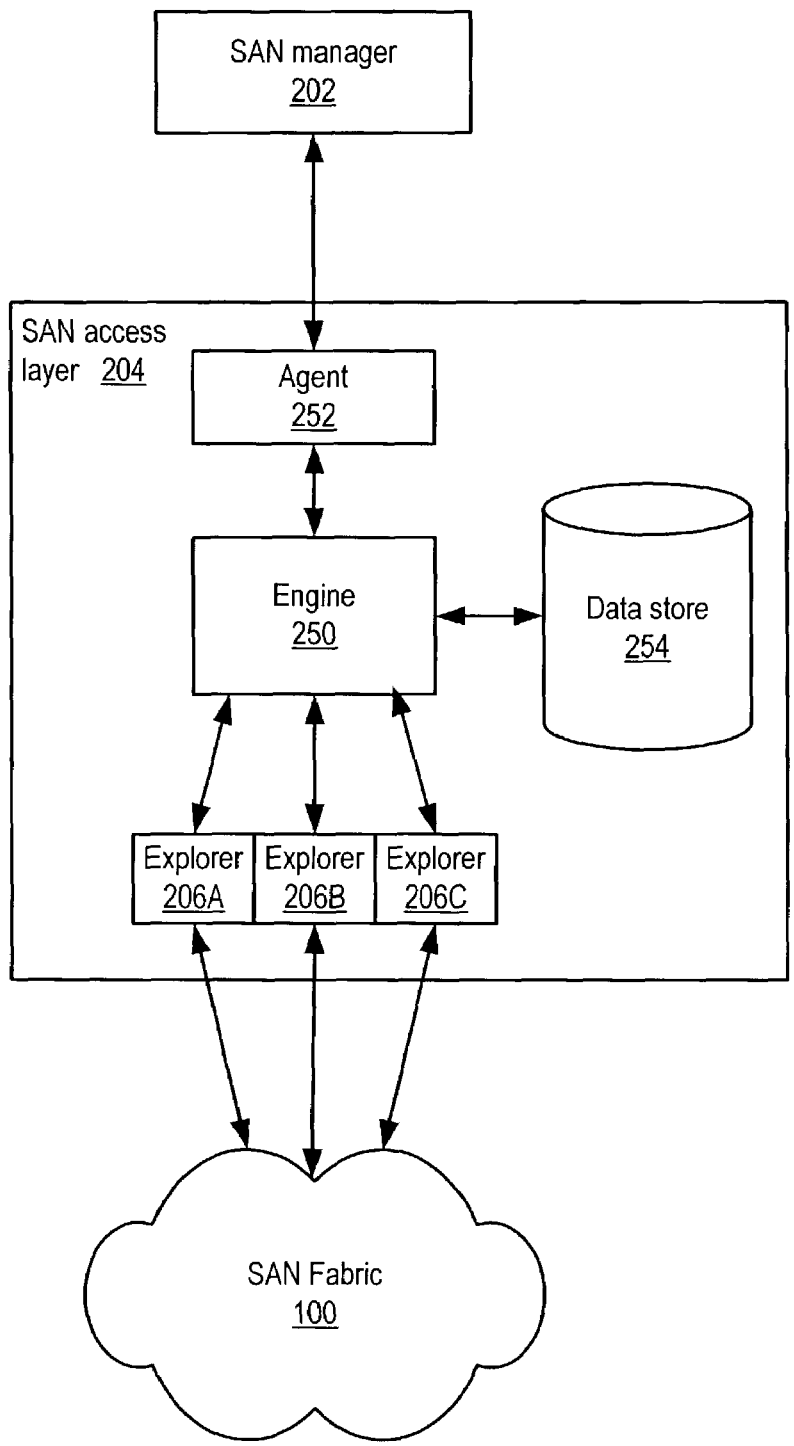
FIG. 8 illustrates the architecture of the SAN access layer according to one embodiment.

FIG. 8 illustrates the architecture of SAN access layer 204 according to one embodiment. In one embodiment, SAN access layer 204 may include an engine 250 that may perform one or more functions which may include, but are not limited to, coordinating the activity of explorers 206, managing changes to data store 254, and performing zoning operations by communicating with switches on fabric 100. In one embodiment, SAN access layer 204 may include one or more explorers that provide an interface to different types of heterogeneous SAN components so that the SAN management system may provide a common data representation for heterogeneous SAN components. Explorers 206 may communicate with the SAN components over Fibre Channel (in-band) and/or Ethernet (out-of-band) connections to inventory the SAN. Each explorer may communicate with a specific type of device using a protocol available for that specific type of device.

Once the SAN is discovered, SAN access layer 204 may continue to monitor the SAN and may update data store 254 as new events occur on the SAN. In one embodiment, SAN access layer 204 may periodically examine the SAN, for example to discover or determine objects that are added, objects that are removed, and connections that are pulled. In one embodiment, data gathered by the explorers may be aggregated into data store 254, which may be updated with real-time information about objects on the SAN. In one embodiment, SAN access layer engine 250 may manage data store 254. In one embodiment, data store 254 may be an embedded, ODBC-compliant, relational database. In one embodiment, data from the database may be imported into a data warehouse to track changes and analyze the SAN over periods.

In one embodiment, SAN access layer 204 may include an agent 252 that translates information from data store 254 into formatted files (e.g. XML files), which may be provided to client applications such as SAN manager 202 or Web browsers. Agent 252 may also enforce user authentication for commands sent to SAN management server 200, and may handle communication between SAN management server 200 and any hosts running a SAN access layer remote (described below).

In one embodiment, SAN manager 202 is a client of SAN access layer 204, and may graphically and/or textually display objects discovered by SAN access layer 204. In one embodiment, SAN manager 202 may open a connection (e.g. TCP/IP socket) with SAN access layer agent 252 and send a message (e.g. an XML message) requesting data stored in data store 254. Upon receiving the request, SAN access layer engine 250 may dynamically create a document (e.g. an XML document) describing the SAN topology. SAN access layer agent 252 then may send this document to SAN manager 202. Once SAN manager 202 successfully receives the message, SAN access layer agent 252 may close the connection. When SAN manager 202 receives the document, it may read the file and display, in graphical and/or textual format, the information the document provides about the SAN.

In one embodiment, the data generated by SAN access layer 204 may be in a format (e.g. XML) that may be read by a Web browser or exported to a file that may be opened and edited using a standard text editor. In one embodiment, a SAN's current state may be captured in a file, e.g. an XML or other markup language file. Thus, snapshots of the SAN may be saved over time, which may be analyzed and compared to current conditions on the "live" SAN.

In one embodiment, SAN access layer 204 may be configured for discovery and device communication through a configuration file. The configuration file may include one or more parameters for the SAN access layer and/or globally for the explorers. Each type of explorer may have a section in the configuration file that may include one or more parameters specific to the particular type of explorer.

Figure 9:
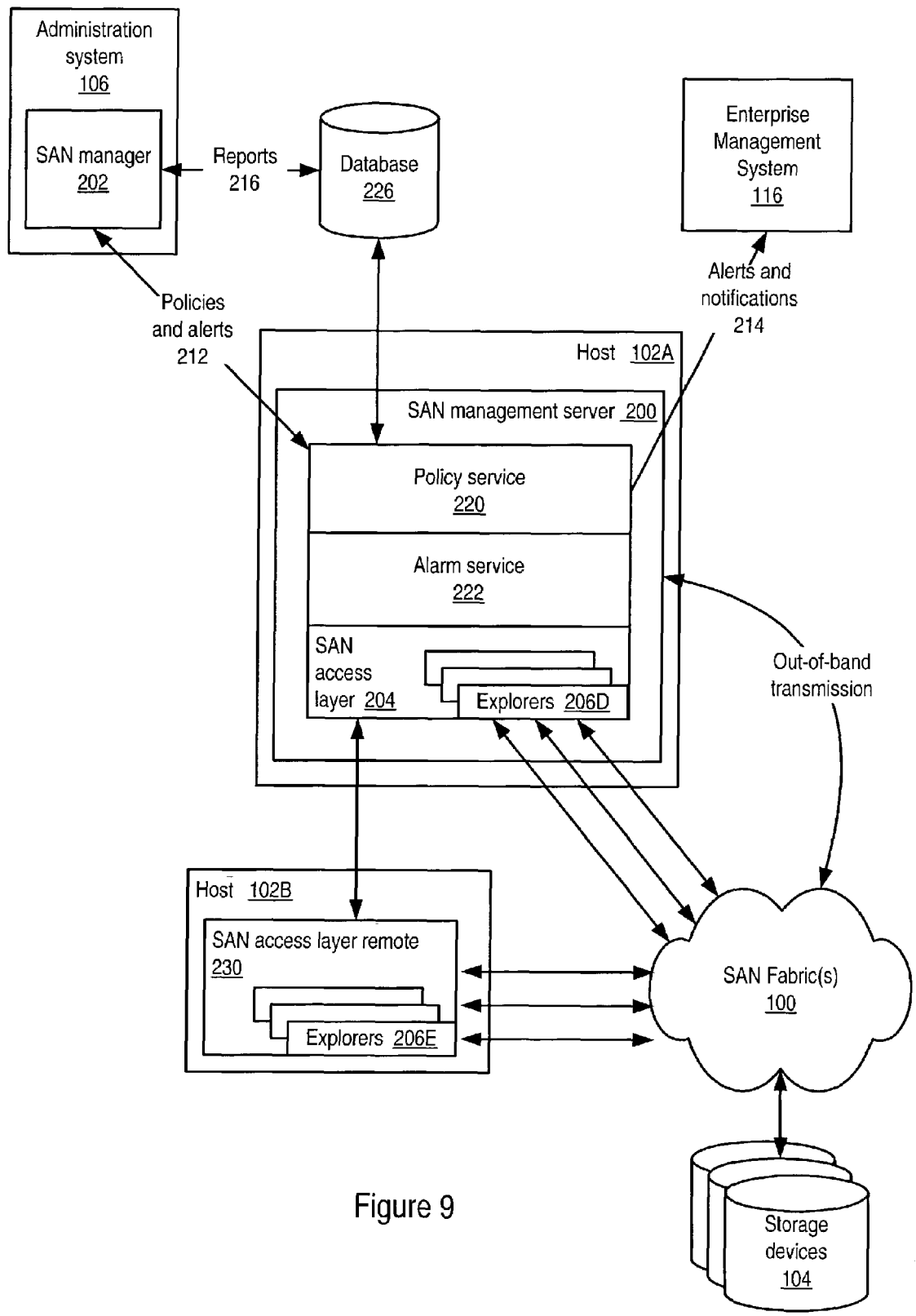
FIG. 9 illustrates an exemplary SAN including a SAN management system and further illustrates the architecture and operation of the SAN management system according to one embodiment.

FIG. 9 illustrates an exemplary SAN and further illustrates the architecture and operation of the SAN management system according to one embodiment. This embodiment may be based on a distributed client-server architecture, and may be divided into components which may include a SAN manager 202, a SAN management server 200, a SAN access layer 204 and a database 226. In this embodiment, SAN access layer 204 may be a component or "layer" of SAN management server 200. SAN management server 200 may also include a policy service 220 and an alarm service 222.

In one embodiment, one or more explorers 206D may be included within SAN access layer 204. In one embodiment, SAN access layer 204 may aggregate information gathered by explorers 206D into a SAN access layer 204 data store. Once the SAN is discovered, SAN access layer 204 may periodically examine the SAN for objects that are added, objects that are removed, and connections that are pulled. In one embodiment, new explorers 206 may be added as needed or desired. For example, if a new type of SAN device is added to the SAN, or an existing type of SAN device is modified or upgraded, an explorer 206 may be added or updated to correctly communicate with the new or updated type of SAN device.

Explorers 206 may use different methods to discover information about heterogeneous SAN objects. In one embodiment, explorers 206 may query objects on the SAN to retrieve a standard set of attributes for each type of object. The terms "information" and "details" may be used to describe the different kinds of data about a SAN that may be discovered, including, but not limited to, SAN events, zone memberships, connectivity, etc. The term "attributes" refers to a subset of that larger body of information. Attributes are details that are particular to a type of object, such as a switch—details such as its vendor, model number, firmware version, port count, World Wide Name (WWN), and out-of-band address.

Explorers 206 may be categorized into types including, but not limited to, switch explorers, zoning explorers, disk array explorers, and Host Bus Adapter (HBA) explorers. Switch explorers may discover switch information such as vendor name, firmware version, and model name. Switch explorers may include, but are not limited to, a management server explorer and an out-of-band switch explorer. A management server explorer may communicate with supported switches over Fibre Channel connections. In one embodiment, the management server explorer may use the Fibre Channel Common Transport (CT) protocol to communicate with switches in fabric 100. The management server explorer may, for example, discover switches in-band over Fibre Channel, obtain switch characteristics, and/or explore port connectivity. In one embodiment, the management server explorer may optionally run over IP networks. For some switches, the management server explorer may run out-of-band. In one embodiment, the management server explorer may perform in-band zoning.

One embodiment may include an out-of-band switch explorer to communicate with switches (or their proxies) over Ethernet. In one embodiment, the out-of-band switch explorer may discover devices managed over any IP network. In one embodiment, the out-of-band switch explorer may use SNMP (Simple Network Management Protocol). SNMP is a protocol for monitoring and managing systems and devices in a network. The data being monitored and managed is defined by a MIB (Management Information Base), the specification and formal description of a set of objects and variables that can be read and possibly written using the SNMP protocol. Some embodiments may use other network protocols, for example Common Management Information Protocol (CMIP), Remote Monitoring (RMON), etc. Enabling the out-of-band switch explorer may include specifying IP addresses for each switch (or for multiple switch fabrics, each proxy) in a SAN access layer configuration file.

Zoning explorers may be used as an interface for SAN access layer 204 to communicate with fabric switches to perform discovery and control of zones in the SAN. When users issue zoning commands, SAN access layer 204 may use a zoning explorer to contact the switch to perform the zoning operation. In one embodiment, zoning explorers may communicate with the switches out-of-band. Embodiments may provide zoning explorers specific to fabric switches provided by various switch vendors. In one embodiment, one or more zoning explorers may complete transactions with a switch management server (name server) to discover zone names and attributes and to perform switch zoning commands.

HBA explorers may discover information about SAN-connected storage devices 104 that are zoned to a host 102 that is running a SAN management server 200 or where a SAN access layer remote 230 (described below) resides. The HBA explorer may interact with a host 102 to discover HBAs and device paths. A device path may be defined as a route through an interconnect that allows two or more devices to communicate. In one embodiment, an HBA explorer may not discover locally attached storage (e.g. disks or other devices attached through a SCSI or IDE controller). If these storage devices have OS handles, then the HBA explorer may return LUN names and attributes. An OS handle may be used by the operating system to identify a storage resource (known as an Addressable Unit, or AU), and the correct methods (e.g. driver/system call) to access the storage resource. If no OS handles are available, then the HBA explorer may identify the device as a generic device (a block device attached to a port on the host).

Disk array explorers may provide information about array names and their attributes, such as number of ports and the number of disks contained in an array. Disk array explorers may discover disk arrays/enclosures and their LUNs. Disk array explorers may pass LUN management commands to the array's management interface (e.g. CCS or SYMCLI) to execute. In one embodiment, disk array explorers may discover LUNs that are not masked to discovered hosts. SAN access layer 204 may include disk array explorers specific to disk arrays of various vendors. In one embodiment, disk array explorers may start when SAN access layer 204 starts. In one embodiment, the disk array explorers may check to see if host 102 has a management interface. If host 102 does not have the management interface, the corresponding explorer may be disabled. If the management interfaces are present, the explorers may determine if the host has access to any LUNs exported by the array. If any LUNs are available, the explorers may attempt to discover the array using the OS handle of the LUN. In one embodiment, some disk array explorers may use an out-of-band network protocol such as SNMP to communicate directly with the disk array controller. IP addresses for each disk array may be supplied for SAN access layer 204 discovery and communication. In one embodiment, SAN access layer 204 may communicate with a disk array through the array's management interface. In one embodiment, the array vendor's management software is installed on a host 102 with an in-band connection to the arrays to be managed. The management software may provide a unified interface/command interpreter between the SAN management system and the arrays on the fabric. In one embodiment, a SAN management server 200 or a SAN access layer remote 230 is installed on the host 102 that is running the management software in order to communicate with the arrays.

In one embodiment, SAN access layer 204 may automatically discover information for each Addressable Unit (LUN) that is under the control of a volume manager. In one embodiment, SAN management server 200 may discover information about HBAs on other hosts 102 attached to fabrics 100 discovered by SAN management server host 102A.

One embodiment may include a SAN access layer remote 230 that may be installed on one or more other hosts 102 in the SAN, if any, to assist SAN management server 200 in discovering the entire SAN. In one embodiment, SAN access layer remote 230 may be installed on every host 102 on the SAN (excepting the host including the SAN access layer 204) to provide complete and accurate discovery. In one embodiment, each installation of SAN access layer remote 230 may include one or more explorers 206E. In one embodiment, explorers 206E may include one or more explorers 206 that may also be used by SAN access layer 204, such as a management server explorer and an HBA explorer. In one embodiment, explorers 206E may also include an out-of-band switch explorer. In one embodiment, SAN access layer 204 and each installation of SAN access layer remote 230 may each include a set of one or more explorers 206 that may be determined by the discovery requirements and/or contents of the region of the SAN visible to the host 102 on which SAN access layer 204 or the installation of SAN access layer remote 230 resides. Each installation of SAN access layer remote 230 may provide information gathered by explorers 206E to SAN access layer 204, which may aggregate this information into SAN access layer 204 data store. In one embodiment, SAN management server 200 communicates with SAN access layer remote(s) 230 across an HTTP connection. In one embodiment, SAN management server 200 may use XML to communicate with SAN access layer remote (s) 230. Other embodiments may use other connections and other communications protocols.

In one embodiment, to get detailed information about a remote host 102, SAN access layer remote 230 may be installed on the host 102, and the host 102 may be added to a SAN access layer configuration file on SAN management server 200. In one embodiment, a host 102 running SAN access layer remote 230 may be specified as either a "Host" or an "In-Band Host" in the SAN access layer configuration file. The "Host" entry may be used to define other hosts 102 attached to the SAN. The "In-Band Host" entry may be used to define at least one SAN access layer remote host 102 per each fabric 100 that is not attached to and thus not discovered by SAN management server 200. In one embodiment, if SAN access layer remote 230 is not installed on a host 102, SAN management server 200 may still discover the HBA, and the enclosure utility may be used to accurately visualize the host in SAN manager 202's user interface.

In one embodiment, policy-based management may enable the monitoring of conditions on a SAN and may facilitate quick response when problems occur. Conditions that may be monitored may fall into one or more categories of interest to storage administrators. Embodiments may use one or more methods for monitoring conditions on a SAN. These methods may include, but are not limited to, out-of-band polling (e.g. SNMP polling), traps (e.g. SNMP traps) and SAN access layer 204. SAN access layer 204 may provide notification of SAN events such as the addition or deletion of SAN components such as SAN fabrics, switches and arrays. One embodiment may monitor conditions in-band, e.g. using the Fibre Channel Common Transport (CT) protocol.

Among other SAN monitoring methods, SAN management server 200 may receive SNMP traps from elements on the SAN. To monitor conditions on a SAN using SNMP traps, some SAN objects may send SNMP traps to SAN management server 200 when an event happens. SNMP-capable devices on the SAN may be configured to send traps to the host 102A running SAN management server 200. In one embodiment, these traps are asynchronous, so the SAN management system cannot poll such an object to determine the current condition. This embodiment may be dependent on the trap sender to report when a condition changes by sending additional traps. In another embodiment, objects may be polled directly to determine the current condition. In one embodiment, to monitor an object on a SAN, the object may include an SNMP agent that is configured to accept SNMP polls and to send SNMP traps.

One embodiment may include collectors. A collector may be a path or channel through which a specific type of data is gathered for a specific object type. Collectors may include one or more of, but are not limited to, collectors for object availability, environmental conditions, device errors, and SAN traffic. Collectors may monitor properties such as switch port status, dropped frames, disk temperature, link failures and so on, which may be evaluated by policy service 220 to create an accurate composite status of the SAN. In one embodiment, the status of devices may be displayed on a topology map of a SAN manager 202 user interface, for example using color-coded icons. In one embodiment, these collectors may be based on devices' SNMP MIB variables. One embodiment may include one collector per data type per object, for each object that can be monitored. In one embodiment, each collector may be associated with an object type, such as a SAN host 102 or a switch port. In one embodiment, each collector may be associated with a type of data, for example textual state or numeric threshold data. Collector data may be used in real-time collector graphs, the policy engine, and the SAN reporter, for example.

One embodiment may include a policy service 220 that manages policies associated with objects on the SAN. Policies may be rules used to help manage a SAN by automating responses to certain events and conditions. Policies may detect when something goes wrong, and may be used to anticipate and handle problems before they occur. A policy may indicate a particular object or type of object to monitor. In general, any object for which at least one collector is provided may be monitored. Objects that may be monitored include, but are not limited to, fabrics 100, switches, switch ports, hosts 102, and disk arrays. One embodiment may include a set of policies that monitor SAN management server 200. A policy may include a description of a condition to monitor on an object, such as a high percentage of bandwidth utilization on a switch port, and a set of actions to take when that condition is met. A policy may indicate one or more actions to be taken when the condition is detected. In one embodiment, policy service 220 may be integrated with SAN manager 202, permitting users to view what policies are in effect on their SAN, to define and modify policies, and to generate inventory and performance reports based on the conditions monitored by policy service 220. In one embodiment, SAN manager 202 may include a policy utility to facilitate policy creation and maintenance. The policy utility may lead a user through the steps of providing the information described above to create user-defined policies. The user may use the policy utility to make changes in predefined or user-defined policies as desired.

One embodiment may include a policy engine that performs the instructions described in all policies enabled on the SAN. In one embodiment, the policy engine may be a component or process of policy service 220. When the objects on the SAN are discovered, collectors corresponding to the objects may be determined and the relevant collectors may be registered with the policy engine. The policy engine then may receive a stream or streams of real-time collector data and compare data values with the conditions described in its policies. When the alarm condition for a particular policy is met, the policy engine performs the actions described in the policy.

An alarm is a signal that is generated by a policy when the condition specified in the policy is detected or evaluated as true. An alarm may be triggered if the condition and alarm action are configured in the policy. An alarm is an internal signal used by the SAN management system. An alert to SAN manager 202 is a configurable response that may result from an alarm being triggered. When an alarm is triggered, the alarm may be referred to as active. In one embodiment, alarms may be dynamic—the alarm resets itself automatically when the condition monitored by the policy returns to a specified "clear state." The clear state for a condition may specified either manually or automatically, depending on whether the condition is a threshold or a textual comparison condition. One embodiment may include an alarm service 222 that may monitor and collect status and performance information from the SAN using both out-of-band (e.g., SNMP) and SAN access layer 204 events. This collector information may be fed into policy service 220 to trigger policy actions and for logging for reporting purposes. In one embodiment, data collected by the alarm service may be logged in database 226.

The conditions available for a policy may be determined by the type of object being monitored. Different types of policy conditions may result in different types of alarms. There may be different types of conditions for various objects managed by SAN management server 200. One type of policy is a threshold condition with action policy which may be used to monitor an object and detect when a particular numeric threshold is reached and sustained for a configurable period. Another type of policy is a text comparison condition with action policy which may be used to evaluate a textual state to determine the status or condition of the resource.

For every policy, one or more actions to be taken when the specified condition is detected may be configured. Actions may, for example, perform corrective and/or notification functions. One type of policy action is a console alert, which may send an alert to SAN manager 202 when the specified condition is detected. The desired level of severity associated with the action may be configurable. Another type of policy action is a command or script that executes a command or executable file specified for the action. Yet another type of policy action is to send e-mail notification to one or more specified recipients. In one embodiment, policy service 220 may be configured to send traps as notifications to applications.

In one embodiment, SAN manager 202 may serve as a centralized point from which a SAN administrator or other user may create and manage groups of SAN objects, including groups of heterogeneous components. One embodiment may provide a group utility for creating and managing logical groups of SAN objects including hosts 102, storage device 104 interconnects, other groups, and other objects that may be members of a group. A group may be defined as an arbitrary set of SAN elements defined by an administrator to help organize and provision resources, and may be implemented by storage administrators to identify and manually provision available storage devices 104 that match the quality of service requirements of particular user groups or applications. The group utility may be used to create logical storage groups where device membership may be based on zoning, LUN masking, hosts etc., and may also be based on the need for a collection of devices to be viewed as one entity for activities such as reporting, configuring and monitoring SAN resources.

One embodiment may support one or more types of groups, including, but not limited to, generic groups, storage accounts, and storage groups. In one embodiment, groups may be nested within other groups. Generic groups may include switches, hosts 102, storage devices 104, and/or nested groups of any group type. Storage accounts may include hosts 102, storage devices 104, and/or nested groups (storage accounts or storage groups only). A storage account may include one or more host objects and all the storage that the administrator assigns to them. Storage groups may include storage devices 104 and/or nested groups (storage groups only). Storage groups may be used to categorize storage resources by quality of service criteria including, but not limited to, cost, performance, capacity and location.

A zone is a set of objects within a SAN fabric that can access one another. By creating and managing zones, the user may control host 102 access to storage resources. One embodiment may provide methods to enforce the access restrictions created by zones on the SAN. These may include methods that correspond to the forms of zoning commonly referred to as soft zoning and hard zoning. Soft zoning, also called advisory zoning, may be enforced simply by filtering the visibility of objects on the SAN so that an object can only see other objects that share at least one zone membership with the object. In hard zoning, a Fibre Channel switch may actively block access to zone members from any objects outside the zone. This may be performed at the level of ports on the switch. Hard zoning may also be referred to as switch port zoning.

One embodiment may support the zoning of objects on the SAN including, but not limited to, switch ports, hosts 102, and storage devices 104. One embodiment may support switch zoning though application program interfaces (APIs) provided by switch vendors, allowing for both hard and soft zoning. In one embodiment, SAN manager 202 may serve as a centralized point from which a user may access SAN management system and/or third-party services, tools, applications, and/or utilities to create and manage zones on the SAN, including zones containing heterogeneous SAN objects. There may be no industry-wide standard for zoning, and different vendors' switches may implement switch zoning in different ways. Thus, one embodiment may use a switch-neutral approach to zoning. One embodiment may provide a zone utility that may facilitate the creation, modification, and deletion of zones. The zone utility may provide storage zone definition, creation and management. The zone utility may be used to administer zones directly and visually; and may reduce or remove the need to use telnet commands or proprietary, hardware-specific Web-based solutions. The zone utility may automatically filter the list of objects on the SAN and present a list of objects that are available to be added to a zone.

One embodiment may integrate storage masking from various array providers to hosts 102 in the SAN. LUN (Logical Unit Number) security is the collective name given to the operations involved in making storage device 104 resources available to hosts 102 on a SAN, and may include LUN locating or searching, LUN binding, LUN masking, and fabric zoning. In one embodiment, LUN security may provide granular control over host 102 access to individual LUNs within an array or other collection of potentially heterogeneous storage devices.

One embodiment may provide a LUN security utility that may provide a central point from which to perform LUN security operations including LUN binding (the creation of access paths (LUNs) between Addressable Units within a disk array and ports on the array), LUN masking (enabling access to Addressable Units for host HBA ports) and fabric zoning (allowing the host to see the AU and create an Operating System (OS) handle for it). In one embodiment, the LUN security utility may be provided through the SAN manager. In one embodiment, the LUN security utility may guide the user through configuring LUN security operations and allow the user to execute the configured LUN security operations with a single operation, for example, a single click of a button in the user interface. LUN security operations configured and initiated using the LUN security utility may be viewed as transactions. A transaction may be defined as a sequence of information exchange and related work that is treated as a unit for the purposes of satisfying a request and for ensuring data integrity. For a transaction to be completed and changes to be made permanent, a transaction has to be completed in its entirety.

One embodiment may provide a LUN query tool that may be used to search for and find LUNs on the SAN that match one or more properties, such as device vendor, storage type, capacity, configuration, cost, and location. The LUN query tool may return a list of all LUNs that meet those requirements. In one embodiment, the LUN query tool may be launched in context from another utility such as a zone utility or a LUN security utility. One embodiment may provide a mechanism for users to manually create objects such as storage enclosures, hosts and generic devices in the SAN access layer data store from SAN manager 202 to represent undiscoverable SAN elements. One embodiment may provide a mechanism for a user to manually enter customized attributes for heterogeneous SAN objects.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A storage area network (SAN), comprising:
   a plurality of storage devices connected to a fabric;
   a plurality of host systems connected to the fabric; and
   one or more of the plurality of host systems configured to:
   execute one or more applications;
   dynamically obtain during runtime a plurality of proxy objects that each provide a proxy for a different respective storage service provided by and running on another one of the plurality of host systems, and store the plurality of proxy objects on said one or more of the plurality of host systems; wherein each different respective storage service is configured to access one or more of the plurality of storage devices to perform one or more storage functions; and
   in response to receiving requests from the one or more applications, access the respective storage services through their respective proxy objects to perform the one or more storage functions on the storage devices such that each of the one or more applications cannot differentiate whether the storage service requested by that application is running locally on the same one of the plurality of host systems as that application or remotely on another one of the plurality of host systems;
   wherein each application of the one or more applications is configured to access one of the proxy objects as though that proxy object were the corresponding storage service running locally on the same host system as that application.

2. The SAN as recited in claim 1, wherein, to dynamically obtain during runtime a given proxy object for a storage service, the one or more of the plurality of host systems are further configured to:
   discover the one of the plurality of storage devices on the fabric;
   access a name service to discover the other one of the plurality of host systems comprising the storage service; and
   obtain the proxy object for the storage service from the other one of the plurality of host systems.

3. The SAN as recited in claim 1, wherein a given respective storage service is represented by one or more database objects, and wherein, to obtain a proxy object for the given respective storage service, the one or more of the plurality of host systems are further configured to obtain copies of the one or more database objects representing that storage service.

4. The SAN as recited in claim 1, wherein the one or more of the plurality of host systems are further configured to dynamically obtain a graphical user interface (GUI) object for a given respective storage service, and store the GUI object on the one or more of the plurality of host systems.

5. The SAN as recited in claim 1, wherein, to access a given respective storage service through the respective proxy object to perform the one or more storage functions on the one of the plurality of storage devices, the one or more of the plurality of host systems are further configured to:

issue a storage service command specifying one of the storage functions to be performed to the proxy object for the given respective storage service;

wherein the proxy object for the given respective storage service is configured to send the storage service command to the given respective storage service on the other one of the plurality of host systems; and wherein the given respective storage service on the other one of the plurality of host systems is configured to:
perform the storage service command on the one of the plurality of storage devices; and
return results of the storage service command to the proxy object on the one or more of the plurality of host systems.

6. The SAN as recited in claim 1, wherein the plurality of host systems are configured to implement a centralized SAN management system for discovering and managing SAN devices including the plurality of storage devices.

7. A given host system for accessing a storage device in a storage area network (SAN), the given host system connected to a fabric in the SAN, the given host system comprising:
means for executing an application on the given host system;
means for discovering during runtime a particular storage service for the storage device from among a plurality of different storage services, wherein said plurality of storage services, including the particular storage service are running on a plurality of other host systems connected to the SAN fabric, wherein each of the plurality of other host systems is distinct from said given host system;
means for dynamically generating on the given host system during runtime a proxy object for the particular storage service, and storing said proxy object on said given host system; wherein said means for dynamically generating is configured to generate said proxy object subsequent to the discovery of the particular storage service; and
means for, in response to receiving a request from the application, generating storage service commands to perform one or more storage functions on the storage device via the proxy object such that the application cannot differentiate whether the particular storage service is running locally on said given host system or remotely on said plurality of other host systems so that the application accesses the proxy object as though the proxy object were the corresponding storage service running locally on the given host system.

8. A method, comprising:
a given host system connected to a storage area network (SAN) fabric dynamically obtaining during runtime a proxy object for a particular storage service of a plurality of different storage services provided by and running on a plurality of other host systems connected to the SAN fabric, wherein the storage service is configured to access a storage device coupled to the SAN fabric to perform one or more storage functions;
the given host system executing an application; and
in response to the given host system receiving a request from the application, the given host system accessing the particular storage service through the proxy object to perform the one or more storage functions on the one of the plurality of storage devices such that the application cannot differentiate whether the storage service is running locally on said host system or remotely on said plurality of other host systems;

wherein the given host system accessing the particular storage service comprises the application accessing the proxy object as though the proxy object were the corresponding storage service running locally on the given host system.

9. The method as recited in claim 8, wherein said dynamically obtaining during runtime a proxy object for the particular storage service comprises:
discovering the particular storage device on the fabric;
accessing a name service to discover the other host system comprising the particular storage service; and
obtaining the proxy object for the particular storage service from the other host system.

10. The method as recited in claim 8, wherein the particular storage service is represented by one or more database objects, and wherein said obtaining the proxy object for the particular storage service comprises obtaining copies of the one or more database objects representing the particular storage service.

11. The method as recited in claim 8, further comprising the host system dynamically obtaining a graphical user interface (GUI) object for the particular storage service, and the host system storing the GUI object on the given host system.

12. The method as recited in claim 8, wherein said accessing the particular storage service through the proxy object to perform the one or more storage functions on the storage device comprises:
issuing a storage service command specifying one of the storage functions to be performed to the proxy object for the particular storage service;
the proxy object for the particular storage service sending the storage service command to the storage service on the other host system;
the particular storage service on the other host system performing the storage service command on the storage device; and
the particular storage service returning results of the storage service command to the proxy object on the host system.

13. The method as recited in claim 8, further comprising:
updating the particular storage service on the other host system; and
automatically updating the proxy object on the host system in response to updating the particular storage service on the other host system.

14. The method as recited in claim 8, wherein the host systems are configured to implement a centralized SAN management system for discovering and managing SAN devices including the storage device.

15. A computer-accessible storage medium, comprising program instructions executable on a given host system executing an application, wherein the given host system is connected a storage area network (SAN) fabric, wherein the program instructions are configured to implement on the given host system:
dynamically obtaining during runtime a proxy object for a particular storage service of a plurality of different storage services provided by and running on a plurality of other host systems connected to the SAN fabric, wherein the storage service is configured to access a storage device coupled to the SAN fabric to perform one or more storage functions; and
in response to receiving a request from the application executing on the given host system, accessing the particular storage service through the proxy object to perform the one or more storage functions on the one of the plurality of storage devices such that the application cannot differentiate whether the storage service is running locally on said host system or remotely on said plurality of other host systems;

wherein accessing the particular storage service comprises the application accessing the proxy object as though the proxy object were the corresponding storage service running locally on the given host system.

16. The computer-accessible storage medium as recited in claim 15, wherein, in said dynamically obtaining during runtime the proxy object for the particular storage service, the program instructions are further configured to implement:

discovering the particular storage device on the fabric;

accessing a name service to discover the other host system running the particular storage service; and obtaining the proxy object for the particular storage service from the other host system.

17. The computer-accessible storage medium as recited in claim 15, wherein the particular storage service is represented by one or more database objects, and wherein, in said obtaining a proxy object for the particular storage service, the program instructions are further configured to implement obtaining copies of the one or more database objects representing the particular storage service.

18. The computer-accessible storage medium as recited in claim 15, wherein the program instructions are further configured to implement dynamically obtaining a graphical user interface (GUI) object for the particular storage service, and storing the GUI object on the host system.

19. The computer-accessible storage medium as recited in claim 15, wherein, in said accessing the particular storage service through the proxy object to perform the one or more storage functions on the storage device, the program instructions are further configured to implement:

issuing a storage service command specifying one of the storage functions to be performed to the proxy object for the particular storage service;

the proxy object for the particular storage service sending the storage service command to the particular storage service on the other host system;

the particular storage service on the other host system performing the storage service command on the storage device; and the particular storage service returning results of the storage service command to the proxy object on the host system.

20. The computer-accessible storage medium as recited in claim 15, wherein the host systems are configured to implement a centralized SAN management system for discovering and managing SAN devices including the storage device.

\* \* \* \* \*

UNITED STATES PATENT AND TRADEMARK OFFICE
CERTIFICATE OF CORRECTION

| | | |
|---|---|---|
| PATENT NO. | : 7,577,729 B1 | Page 1 of 1 |
| APPLICATION NO. | : 10/304438 | |
| DATED | : August 18, 2009 | |
| INVENTOR(S) | : Umbehocker et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1181 days.

Signed and Sealed this

Seventh Day of September, 2010

David J. Kappos
*Director of the United States Patent and Trademark Office*